United States Patent Office 2,747,969
Patented May 29, 1956

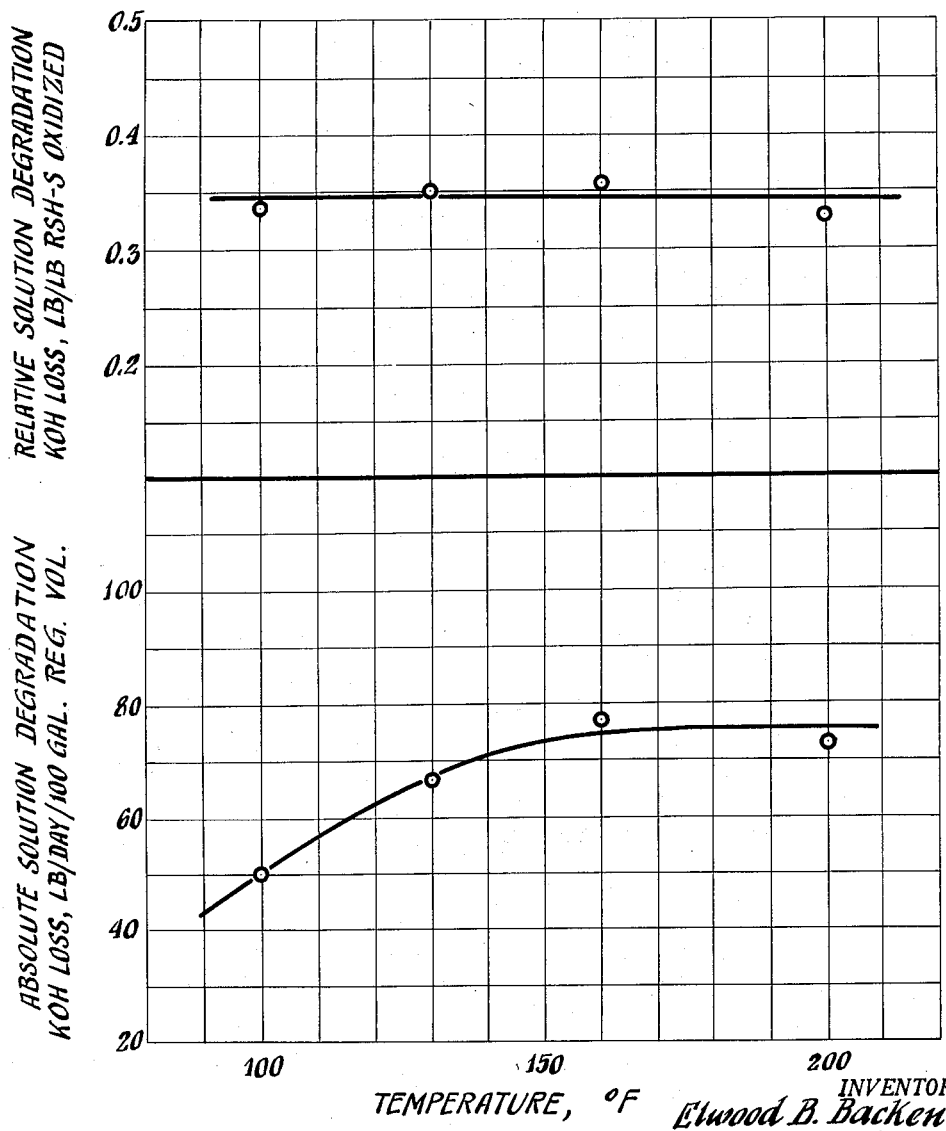
Fig. 1 — EFFECT OF TEMPERATURE ON SOLUTION DEGRADATION FOR PRESSURE REGENERATION

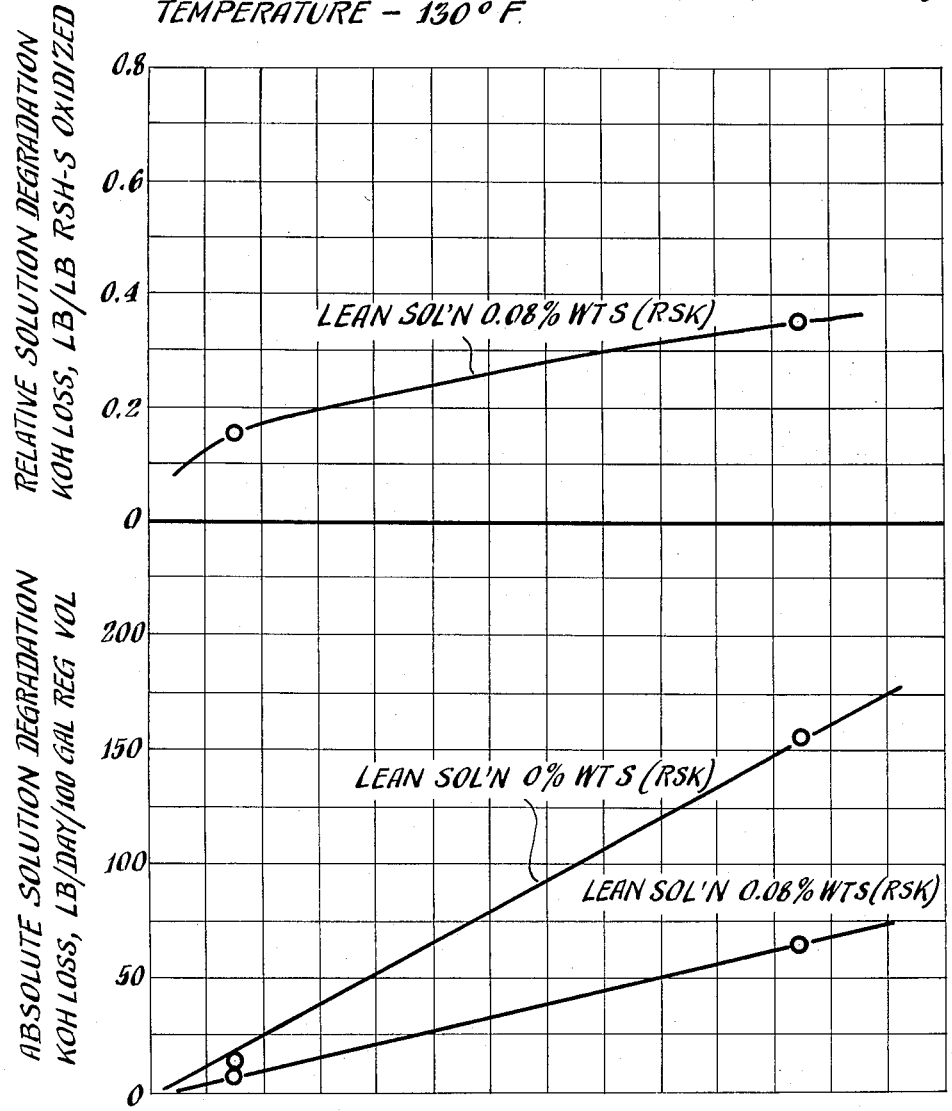

2,747,969

RESTRICTED NON-CATALYTIC OXIDATIVE REGENERATION

Elwood B. Backensto and Kenneth F. Hayden, Woodbury, N. J., assignors to Socony Mobil Oil Company, Inc., a corporation of New York Application March 12, 1952, Serial No. 276,216

2 Claims. (Cl. 23—184)

The present invention relates to the regeneration of alkaline solutions which have been used to extract weakly acidic sulfur compounds from petroleum fluids and, more particularly, to the regeneration in the absence of catalysts and at superatmospheric pressure of alkaline solutions which have been used to extract weakly acidic sulfur compounds from petroleum fluids.

For many years it has been refinery practice to treat mercaptan-containing fractions of petroleum to either convert the mercaptans to polysulfides which remain in the petroleum fraction or to extract the mercaptans with alkaline solutions and regenerate the fouled solutions.

About 20 years ago (J. C. S. London 127,898), it was first discovered that mercaptans can be converted to polysulfides by passing air through an alkaline solution of the mercaptans which are presumably in the form of salts known as mercaptides. Subsequently, it has been found that the reaction can be accelerated by the use of sulfides of nickel, copper, etc., or polyhydroxybenzenes, such as hydroquinone, pyrogallol, and the like, or tannins, such as tannic acid, and the vegetable tannins. In U. S. Patent No. 2,001,715, Fischer has disclosed that mercaptans, in the form of mercaptides, can be converted to polysulfides in the absence of catalysts by passing air under superatmospheric pressure through the alkaline solution containing mercaptides. Thus, there is nothing novel in the conversion, per se, of mercaptides to polysulfides in the absence of a catalyst by passing air through an alkaline solution of mercaptides at atmospheric or superatmospheric pressure. However, when this concept is applied to the regeneration of alkaline solutions which are used in a cyclic system involving extraction of mercaptans from hydrocarbon fluids, followed by regeneration by air-blowing and subsequent use of the regenerated solution to extract mercaptans from other mercaptan-containing petroleum fractions, degradation of the alkaline solution occurs.

Degradation is defined for the purposes of this discussion as the reduction in the concentration of alkali metal hydroxide resulting from regeneration and is expressed as "Absolute Solution Degradation" in terms of pounds of alkali metal hydroxide loss per day per 100 gallons of regenerator volume. This term is merely a preferred means of expressing the rate of alkali hydroxide degradation. Other means of expressing alkali hydroxide degradation such as pounds of alkali hydroxide loss per unit volume of solution circulated per unit time may also be used. Thus a conventional solutizer solution of potassium hydroxide containing cresols or cresylates as the solutizer, when subjected to regeneration with air under pressure and at a temperature in the order of 150° F. loses potassium hydroxide at a rapid rate. For example, a solutizer treating unit treating 13,000 barrels of gasoline per day containing about 0.015 per cent weight mercaptan sulfur, where the foul treating solution containing mercaptides was regenerated to near extinction of mercaptides with air at a pressure of 100 p. s. i. g. and a temperature of 150° F., potassium hydroxide was lost at a rate of 71 pounds of potassium hydroxide per hundred gallons of regenerator volume. A simple calculation establishes that the "Degradation" cost is about seven dollars per hundred gallons of regenerator volume or about seventy dollars per day for a 1000 gallon regenerator, and that the degradation cost per barrel of gasoline is about one half cent per barrel. When a tenth of a cent per barrel increase in treating cost is cause for concern, it is manifest that a loss of several hundred pounds of alkali metal hydroxide per day is an important item.

Since the use of superatmospheric pressure and temperatures up to 200° F. accelerates the conversion of mercaptides to polysulfides, it is important to use the highest temperature and the highest practical pressure commensurate with the use of conventional regenerating equipment.

As shown in Figure 1 of the drawing, the "Absolute Solution Degradation" increases with increase of temperature of regeneration up to about 160° F. but the "Relative Solution Degradation" which represents pounds of alkali hydroxide loss per pound of mercaptide sulfur oxidized to disulfide during regeneration, is essentially constant up to 200° F. From a practical standpoint, this means that temperature has essentially no effect on solution degradation rate.

As shown in Figure 2 of the drawing, both "Absolute" and "Relative Solution Degradation" increase with increasing pressure in regeneration.

Thus, it is apparent that, if alkali metal hydroxide solutions fouled with mercaptides are to be regenerated in a practical manner with air at superatmospheric pressure, some solution to the problem of solution degradation must be found.

Before discussing the solution to this problem, it is desirable to revert to the Fischer U. S. Patent No. 2,001,715. The purpose of the patentee's invention was the production of organic disulfide and related compounds from caustic solutions containing mercaptans and the like. The patentee represents the conversion by the following equation:

$$4RSNa + O_2 \rightarrow 2R_2S_2 + 2Na_2O$$ 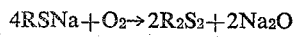

in which R may represent either aryl or alkyl groups. The patentee states that this reaction takes place at about 100° F. to 400° F.; that is to say, the patentee extracted a distillate with a 3 to 6 per cent aqueous solution of caustic soda. The spent aqueous solution of caustic soda was heated to about 210° F. and preferably within the limits of 100° F. to 400° F. at 80 pounds pressure and thoroughly mixed with an amount of oxygen desirably somewhat less than that required for the complete regeneration of the caustic soda solution and insufficient to produce substantial amounts of oxides of carbon. The amount of oxygen to achieve the aforesaid end is indeterminate since at temperatures below 400° F. no oxides of carbon are produced even when the mercaptide content of the aqueous alkali metal hydroxide solution is converted completely to other products. The data in Table I establishes that no carbonates are produced at temperatures below 400° F. when the mercaptide content is reduced to 0.00. The data presented in Table I were obtained by subjecting a solution of butyl mercaptan in 8 normal aqueous potassium hydroxide solution to the passage of oxygen therethrough under the conditions noted in the table.

Table I

| Run | Temp., °F. | Oxygen Pressure, p. s. i. g. | Contact Time, Minutes | Mercaptides, Wt. Percent Sulfur | | Carbonates, Wt. Percent $K_2CO_3$ | | Sulfide, Wt. Percent $K_2S$ | |
|---|---|---|---|---|---|---|---|---|---|
| | | | | Initial | Final | Initial | Final | Initial | Final |
| A | 150 | 50 | 60 | 1.88 | 0.00 | 0.00 | 0.00 | 0.00 | 0.00 |
| B | 225 | 50 | 30 | 1.88 | 0.00 | 0.00 | 0.00 | 0.00 | 0.00 |
| C | 310 | 50 | 30 | 1.88 | 0.00 | 0.00 | 0.00 | 0.00 | 0.00 |
| D | 400 | 50 | 30 | 1.80 | 0.39 | 0.00 | 6.30 | 0.00 | 2.10 |
| E | 400 | 50 | 30 | 0.39 | 0.097 | 6.30 | 11.2 | 2.10 | 1.90 |
| F | 400 | 100 | 60 | 0.95 | 0.15 | 0.00 | 4.84 | 0.00 | 1.50 |

Thus, it is manifest that in an aqueous solution of alkali metal hydroxide in the range 150° F. to 310° F. at least no carbonates or sulfides are formed during the conversion of mercaptides to disulfides by oxygen. Thus, there is no degradation of the solution when the solution contains only the mercaptides and the alkali metal hydroxide. On the other hand, when in addition to the mercaptides and alkali metal hydroxide the solution contains phenols, such as the cresylates, the degradation by loss of alkali metal hydroxide is a practical economic problem.

It has been found that the degradation of treating solutions containing cresylates as solutizers can be substantially reduced by leaving in the regenerated solution a critical amount of unconverted mercaptides. The data presented in Table II establish that the minimum concentration of mercaptide sulfur to reduce solution degradation is 0.05 weight per cent sulfur (RSM) (where M is Na or K) and can be as high as 0.50 although because of the effect of re-entry value upon the extraction capabilities of the regenerated solution it is preferred to maintain the level of unconverted mercaptides at about 0.05 to 0.10 weight per cent.

The data presented in Table II were obtained by recirculating five gallons of a 6 N KOH—2 N KCr solution through a turbo-aerator at a rate (0.22 G. P. M.) to give 15 minutes residence time (6 N KOH—2 N KCr is an aqueous solution 6 normal to potassium hydroxide and 2 normal to potassium cresylate). All runs were divided into periods of from three to seven and five tenths hours. The number of periods per run varied from three to twelve, representing in some cases 200 operational cycles. A constant temperature was maintained by pumping the solutizer solution through a heat exchanger before it entered the turbo-aerator. The mercaptans were injected continuously into the solutizer solution at a point before it entered the heat exchanger. The rate of mercaptan addition was controlled to give a constant mercaptide content in the regenerated solution. The air supply to the turbo-aerator was kept constant throughout a run. Liquid and vapor leaving the turbo-aerator were passed into a vessel where gases and disulfide oil were separated from the solutizer solution. The gases were passed through a wet test meter and rejected. The lean solutizer solution was then recycled.

The runs were made with oxygen to eliminate the carbon dioxide normally present in air which would cause the formation of carbonate in the solutizer solution. Pressure equal to the partial pressure of oxygen at the desired air pressure was used. Thus, for regeneration at 100 p. s. i. g. air, the corresponding oxygen pressure is 8 p. s. i. g. Since initial mercaptide conversion rates using oxygen agree with values obtained using air this means of eliminating the formation of carbonates is not objectionable. The data reported in Table II are given in terms of air pressure.

Solution: Aqueous 6 N KOH—2 N KCr
Mercaptans: Mixed mercaptans extracted from gasoline
Residence time: 15 minutes
Air inlet rate: 6.0 C. F. M./100 gal. regenerator volume
Solution circulation rate: 6.6 G. P. M./100 gal. regenerator volume Table II

| Pressure | Atmospheric | | | 100 p. s. i. g. | | | | | | |
|---|---|---|---|---|---|---|---|---|---|---|
| Temperature, °F | 130 | 130 | 130 | 130 | 130 | 130 | 160 | 160 | 160 | 200 |
| Regenerated Solution: | | | | | | | | | | |
| Weight Percent S (RSK) | [3]0 | 0 | 0.08 | 0 | 0.05 | 0.08 | 0 | 0.08 | 0.20 | 0.08 |
| KOH Loss [1] | [4]15 | [4]12 | 8 | [4]155 | 84 | 66 | [4]193 | 73 | 76 | 72 |
| KOH Loss [2] | α | α | 0.15 | α | 0.49 | 0.35 | α | 0.36 | 0.26 | 0.33 |
| Reduction of KOH, Loss Percent | | | 40.7 | | 45.8 | 57.5 | | 59.6 | 60.6 | 63.3 |

[1] KOH loss—lbs./day/100 gallon regenerator volume.
[2] KOH loss—lb./lbs. sulfur regenerated.
[3] 3.3 N NaOH—2 N KCr solution.
[4] No RSH—S added.

It has been established that in non-catalytic regeneration increasing the pressure from atmospheric to 100 p. s. i. g. results in a three to four-fold increase in mercaptide sulfur conversion rate which is accompanied by an eight-fold increase in the solution degradation rate. However, for a given quantity of sulfur converted, the increase in solution degradation is only approximately two-fold. It will be noted that regenerating under conditions whereby 0.05 to 0.20 weight per cent mercaptide sulfur remains in the regenerated solution reduces the solution degradation from 155 lbs./day/100 gallons to 66 lbs./day/100 gallons for regeneration at 130° F. at 100 p. s. i. g. and from 193 lbs. to 76 lbs./day/100 gallons for regeneration at 160° F. at 100 p. s. i. g. In other words, retention in the regenerated solution of from 0.05 to 0.2 weight per cent mercaptide sulfur when regenerating at 130° F. and 100 p. s. i. g. reduces the loss of alkali metal hydroxide about 46 to about 58 per cent and when regenerating at 160° F. to 200° F. at 100 p. s. i. g. reduces the loss of alkali metal hydroxide about 60 to 63 per cent.

Accordingly, the present invention provides for the regeneration of alkali metal hydroxide solutions containing alkyl phenols at pressures in excess of atmospheric at temperatures in excess of 100° F. for a period of time sufficient to convert all but about at least 0.05 weight per cent mercaptide sulfur in said alkali metal hydroxide solution to polysulfides and to leave at least about 0.05 weight per cent or about 0.05 to about 0.3 weight per cent mercaptide sulfur unconverted to polysulfides in the regenerated solution.

We claim:
1. The non-catalytic method of regenerating aqueous alkaline solutions containing alkali metal alkyl phenolates which solutions have been used to extract weakly acidic sulfur compounds from petroleum fluids which comprises contacting at temperatures of about 130° F. to about 200° F. and at pressures of about 80 to about 100 p. s. i. an aqueous alkaline solution containing alkali metal mercaptides, at least 132 grams per liter of alkali metal hydroxide, and at least 200 grams per liter of alkyl phenols, but devoid of amounts of phenolic oxidation promoter effective to accelerate the conversion of mercaptides to polysulfides with an amount of oxygen in excess of the stoichiometric equivalent of said mercaptides as a gas containing free oxygen to convert a portion of said mercaptides to polysulfides but to leave unconverted about 0.05 to about 0.3 weight per cent mercaptide sulfur in said aqueous solution, and separating polysulfides from said aqueous alkaline solution to provide a regenerated aqueous alkaline solution to be used for extracting weakly acidic sulfur compounds from petroleum fluids and containing said unconverted mercaptide sulfur and the original amount of alkali metal hydroxide reduced by not more than about 0.49 pound of alkali metal hydroxide per pound of mercaptide sulfur converted to polysulfides.

2. The non-catalytic method of regenerating aqueous alkaline solutions containing alkali metal alkyl phenolates which solutions have been used to extract weakly acidic sulfur compounds from petroleum fluids which comprises contacting at temperatures of about 130° F. to about 200° F. and at presures of about 80 to about 100 p. s. i. an aqueous alkaline solution containing alkali metal mercaptides, at least 132 grams per liter of alkali metal hydroxide, and at least 200 grams per liter of alkyl phenols, but devoid of amounts of phenolic oxidation promoter effective to accelerate the conversion of mercaptides to polysulfides with an amount of oxygen in excess of the stoichiometric equivalent of said mercaptides as a gas containing free oxygen to convert a portion of said mercaptides to polysulfides but to leave unconverted about 0.05 to about 0.1 weight per cent mercaptide sulfur in said aqueous solution, and separating polysulfides from said aqueous alkaline solution to provide a regenerated aqueous alkaline solution to be used for extracting weakly acidic sulfur compounds from petroleum fluids and containing said unconverted mercaptide sulfur and the original amount of alkali metal hydroxide reduced by not more than about 0.49 pound of alkali metal hydroxide per pound of mercaptide sulfur converted to polysulfides.

References Cited in the file of this patent

UNITED STATES PATENTS

| | | |
|---|---|---|
| 2,001,715 | Fischer | May 21, 1935 |
| 2,080,654 | Craig | May 18, 1937 |
| 2,248,109 | Morrison et al. | July 8, 1941 |
| 2,413,945 | Bolt | Jan. 7, 1947 |
| 2,426,087 | Fetterly | Aug. 19, 1947 |
| 2,431,770 | Payne | Dec. 2, 1947 |
| 2,432,301 | Fetterly | Dec. 9, 1947 |
| 2,472,473 | Fetterly | June 7, 1949 |
| 2,583,083 | Bond | Jan. 22, 1952 |
| 2,600,465 | Bond | June 17, 1952 |